(12) United States Patent
Saiga

(10) Patent No.: US 7,903,301 B2
(45) Date of Patent: Mar. 8, 2011

(54) IMAGING OPTICAL SYSTEM AND IMAGE READING APPARATUS USING THE SAME

(75) Inventor: Takeyoshi Saiga, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 11/961,727

(22) Filed: Dec. 20, 2007

(65) Prior Publication Data

US 2008/0151329 A1      Jun. 26, 2008

(30) Foreign Application Priority Data

Dec. 26, 2006   (JP) .................................. 2006-349556

(51) Int. Cl.
*H04N 1/04* (2006.01)
(52) U.S. Cl. .......................... 358/494; 358/481; 358/474
(58) Field of Classification Search .................. 358/494, 358/481, 474
See application file for complete search history.

(56) References Cited

U.S. PATENT DOCUMENTS

| | | | |
|---|---|---|---|
| 5,825,560 A | 10/1998 | Ogura et al. | 359/822 |
| 5,847,887 A | 12/1998 | Ogura et al. | 359/822 |
| 6,021,004 A | 2/2000 | Sekita et al. | 359/676 |
| 6,124,986 A * | 9/2000 | Sekita et al. | 359/691 |
| 6,166,866 A | 12/2000 | Kimura et al. | 359/729 |
| 6,204,978 B1 * | 3/2001 | Akiyama et al. | 359/729 |
| 6,292,309 B1 | 9/2001 | Sekita et al. | 359/729 |
| 6,301,064 B1 * | 10/2001 | Araki et al. | 359/834 |
| 6,366,411 B1 | 4/2002 | Kimura et al. | 359/729 |
| 6,636,360 B1 | 10/2003 | Tanaka et al. | 359/678 |
| 6,639,729 B2 | 10/2003 | Tanaka et al. | 359/676 |
| 6,785,060 B2 | 8/2004 | Kimura et al. | 359/729 |

FOREIGN PATENT DOCUMENTS

| | | |
|---|---|---|
| JP | 3-113961 | 5/1991 |
| JP | 8-292371 | 11/1996 |
| JP | 2004-133378 | 4/2004 |

* cited by examiner

Primary Examiner — Houshang Safaipour
(74) Attorney, Agent, or Firm — Fitzpatrick, Cella, Harper & Scinto

(57) ABSTRACT

An imaging optical system for imaging imagewise information provided on a surface of an original, upon a surface of an image pickup device such that the imagewise information is read based on signals from the image pickup device, the imaging optical system including four off-axial reflection surfaces which are asymmetric within a sub-scan section, wherein, when a combined power, in a main-scan direction, of two off-axial reflection surfaces of said four off-axial reflection surfaces which are optically close to an original side is denoted by Mf and a combined power, in the main-scan direction, of two off-axial reflection surfaces of the four off-axial reflection surfaces which are optically close to an image pickup device side is denoted by Mr, relations −0.3<Mf/Mr<0.3 and 0<Mr are satisfied.

6 Claims, 7 Drawing Sheets

IMAGING OPTICAL SYSTEM AND IMAGE READING APPARATUS USING THE SAME

FIELD OF THE INVENTION AND RELATED ART

This invention relates to an imaging optical system and an image reading apparatus using the same. Particularly, the present invention is suitably usable in an image scanner, a digital copying machine, and a facsimile machine and so on, for reading imagewise information such as a monochromatic image or a color image based on signals from a line sensor (image pickup device).

Conventionally, as an image reading apparatus (image scanner) for reading imagewise information recorded or provided on the surface of an original, several proposals have been made in regard to a flat bed type image scanner (see Patent Document No. 1 below).

Generally, such flat bed type image scanners are based on a 2:1 mirror scanning method in which an imaging lens (imaging optical system) and a line sensor (CCD) are held fixed while only a reflecting mirror provided in a light path is moved to scan the surface of an original by slit exposure, thereby to read the imagewise information.

In recent years, a carriage integral type scanning method has been used in many applications, in which method a reflecting mirror, an imaging lens, a line sensor and so on are unified to scan the surface of an original, in an attempt to simplifying the structure.

FIG. 7 is a schematic diagram of a main portion of an image reading apparatus using such conventional carriage integral type scanning method. In the drawing, a light beam emitted from an illumination source 81 directly illuminates an original 87 which is placed on an original table (original table glass) 82.

The light beam reflected by the illuminated original 87 is sequentially reflected by first, second and third reflecting mirrors 83a, 83b, 83c whereby the light path is folded inside a carriage 86. Then, the light beam is imaged on the surface of a line sensor (image pickup device) 85 by means of an imaging lens (imaging optical system) 84.

On the other hand, the carriage 86 is driven in the direction of an arrow A (sub-scan direction) depicted in FIG. 7, by means of a driving motor 88, by which the imagewise information of the original 87 is read.

The line sensor 85 shown in FIG. 7 is comprised of such structure that a plurality of light receiving elements are arrayed in one-dimensional direction and along a direction perpendicular to the sheet of the drawing (main-scan direction).

FIG. 8 is a schematic diagram illustrating a basic structure of the imaging optical system of the image reading apparatus shown in FIG. 7.

Denoted in FIG. 8 at 84 is imaging lens. Denoted at 85 is a line sensor group which includes line sensors 85R, 85G and 85B for reading colors of R (red), G (green) and B (blue), respectively.

Denoted at 87R, 87G and 87B are reading ranges defined on the original 87 surface, corresponding to the line sensors 85R, 85G and 85B, respectively.

By scanning the original 87 surface in the sub-scan direction, the same point on the original surface can be read at certain time intervals, with respect to different colors, by means of the line sensor 85R, 85G and 85B, respectively.

In the structure described above, if the imaging lens 84 comprises a dioptric system, longitudinal chromatic aberration or chromatic aberration of magnification will be produced. This causes defocusing or positional misregistration in the line image focused on the line sensor 86B or 85R, with respect to the line sensor 85G which is a reference.

Thus, when images of these colors are superimposed, a resultant image will have conspicuous color bleeding or misregistration. Such color bleeding or misregistration will be unacceptable if high aperture or resolution optical performance is required.

On the other hand, according to several proposals recently made in regard to non-coaxial optical systems, it is possible to provide an aberration-corrected optical system while introducing a concept of reference axis, that is, by forming a constituent surface based on an asymmetric and aspherical surface (see Patent Document No. 2 below).

Patent Document No. 2 shows a design method therefor.

Furthermore, as an imaging optical system of much simpler structure, several proposals have been made in regard to imaging optical systems which are comprised of a less number of free-form curved mirrors (see Patent Document No. 3 below).

Such non-coaxial optical system is called an off-axial optical system.

The off-axial optical system can be defined as an optical system which includes a curved surface (off-axial curved surface) such that, when a reference axis extending along a light ray passing through a center of the image and the center of a pupil is considered, a surface normal to a constituent surface at the point of intersection with the reference axis does not lie on the reference axis.

Here, the reference axis has a bent shape.

In such the off-axial optical system, generally the constituent surface becomes non-coaxial, and no eclipse occurs at the reflection surface. Therefore, an optical system using a reflection surface is easy to make.

The off-axial optical system comprised of only reflection surfaces has a further advantage that no chromatic aberration occurs and, hence, it is free from color bleeding as of conventional dioptric systems. Hence, it can meet high aperture or resolution performance requirement.

[Patent Documents]

No. 1: Japanese Laid-Open Patent Application No. 3-113961

No. 2: Japanese Laid-Open Patent Application No. 8-292371

No. 3: Japanese Laid-Open Patent Application No. 2004-133378

In the image reading apparatus using an off-axial optical system disclosed in Patent Document No. 3, although advantageous features described above may be provided, there still remains the following inconveniences.

In the off-axial optical systems, since the reference axis is folded, a substantial back focus thereof is shortened as compared with conventional rotationally symmetric coaxial systems. Then, the image pickup device has to be attached in a small space, and the installation adjustment of the image pickup device is difficult to do.

On the other hand, in order to improve the optical performance, the optical path length has to be longer, causing enlargement in size of the optical system. Then, it becomes quite difficult to place the imaging optical system within a small inside space of the carriage integral type image reading apparatus.

Furthermore, charge-coupled devices (CCD) are becoming smaller in size and, hence, imaging optical systems having high imaging magnification are desired.

In the imaging optical systems, the optical path length (TC length) from the reading position on the original surface to the image plane is restricted by the machine components of the carriage which accommodates them.

If the optical path length is constant, it is necessary to shorten the focal length and the back focus of the imaging optical system to improve the magnification of the imaging optical system to a high power.

If the back focus is short, disposition of the image pickup device becomes difficult to do.

In off-axial optical systems having short back focus, the optical path length must be enlarged in order to obtain a larger magnification. In other words, a large magnification is difficult to achieve if the optical path length is held constant.

If on the other hand the optical path length is prolonged, the whole system becomes large in size.

Hence, it is very difficult to make the magnification of the imaging optical system larger while keeping the optical path length short and the imaging optical system small in size.

SUMMARY OF THE INVENTION

The present invention provides an imaging optical system having a short optical path length and being compact in overall size, yet having good optical performance and a long back focus. Also, the present invention provides an image reading apparatus having such imaging optical system.

In accordance with an aspect of the present invention, there is provided an imaging optical system for imaging imagewise information provided on a surface of an original, upon a surface of an image pickup device such that read the imagewise information is read based on signals from the image pickup device, said imaging optical system comprising: four off-axial reflection surfaces which are asymmetric within a sub-scan section, wherein, when a combined power, in a main-scan direction, of two off-axial reflection surfaces of said four off-axial reflection surfaces which are optically close to an original side is denoted by Mf and a combined power, in the main-scan direction, of two off-axial reflection surfaces of said four off-axial reflection surfaces which are optically close to an image pickup device side is denoted by Mr, relations $-0.3<Mf/Mr<0.3$ and $0<Mr$ are satisfied.

In one preferred form of this aspect of the present invention, when a combined power, in a sub-scan direction, of two off-axial reflection surfaces of said four off-axial reflection surfaces which are optically close to the original side is denoted by Sf and a combined power, in the sub-scan direction, of two off-axial reflection surfaces of said four off-axial reflection surfaces which are optically close to the image pickup device side is denoted by Sr, a relation $0.1<Sf/Sr<0.5$ is satisfied.

When a power of said imaging optical system in the main-scan direction is denoted by Mt and the combined power, in the main-scan direction, of two off-axial reflection surfaces of said four off-axial reflection surfaces which are optically close to the original side is denoted by Mf, a relation $-0.3<Mf/Mt<0.3$ may be satisfied.

When a power of said imaging optical system in the sub-scan direction is denoted by St, the combined power, in the sub-scan direction, of two off-axial reflection surfaces of said four off-axial reflection surfaces which are optically close to the original side is denoted by Sf, and a combined power, in the sub-scan direction, of two off-axial reflection surfaces of said four off-axial reflection surfaces which are optically close to the image pickup device side is denoted by Sr, relations $0<Sf/St<0.6$ and $1.1<Sr/St<1.6$ may be satisfied.

When a length of a reference axis from the surface of the original to one off-axial reflection surface which is optically closest to the surface of the original is denoted by Lo (mm), and a length of the reference axis from the one off-axial reflection surface optically closest to the surface of the original, to the surface of the image pickup device, is denoted by Lb (mm), relations $0.07<Lb/Lo<0.25$ and $Lo<400$ mm may be satisfied.

In accordance with another aspect of the present invention, there is provided an image reading apparatus, comprising: an imaging optical system as recited above; an original table on which an original is to be placed; and an image pickup device, wherein imagewise information of the original placed on said original table is imaged upon said image pickup device by means of said imaging optical system, and wherein the original and said image pickup device are relatively moved relative to each other, by which the imagewise information of the original is read based on signals from said image pickup device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
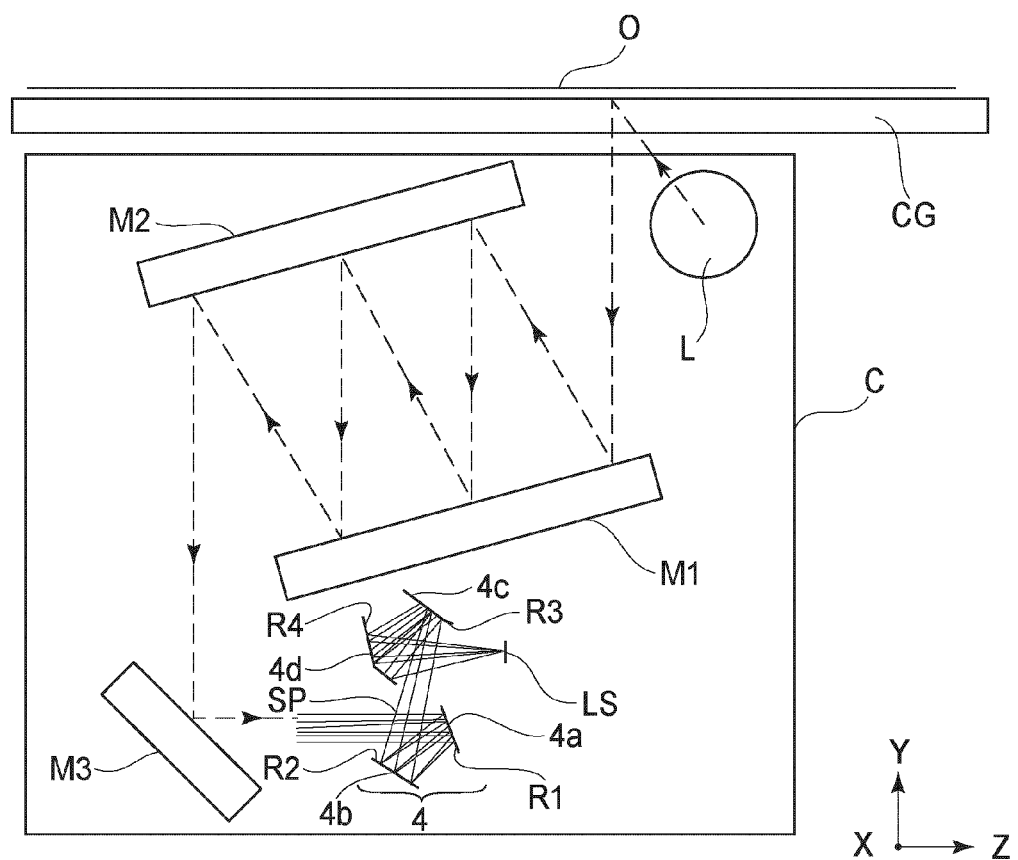
FIG. 1 is a schematic diagram of a main portion of an image reading apparatus according to a first embodiment of the present invention.

Preferred embodiments of the present invention will now be described with reference to the attached drawings.

In order to make clearer the structure and numerical values used in imaging optical systems according to the following preferred embodiments of the present invention, the off-axial optical system and the reference axis which provides a framework for that, to be explained in this specification, will be defined first, as follows.

[Definition of Reference Axis]

Generally, the light path of a light ray of a reference wavelength providing a reference, extending from an object to an image plane, is defined as a reference axis in that optical system.

This definition still contains an ambiguity with respect to how to choose such light ray that provides a reference. Therefore, a reference light beam, namely, the reference axis, is normally set in accordance with either one of two principles to be described below.

If in an optical system there is any axis at least partially having symmetry so that aberration can be adjusted well symmetrically, a light ray that goes along such axis having symmetry can be taken as a reference beam.

On the other hand, if generally there is no such symmetric axis in an optical system or aberration cannot be adjusted well symmetrically even though it has an axis partially having symmetry, among those light rays coming from the center of an object surface (center of a range to be photographed or observed), the light ray which passes through the optical system in accordance with the prescribed surface order of the optical system and which goes through the center of a stop defined in the optical system, is taken as a reference beam.

The distance between components along this reference light beam is referred to as a distance (length) of the reference beam axis.

Generally, the reference axis defined in this manner has a folded shape.

With regard to a point where the reference axis defined as described above intersects with a curved surface, a curved surface whose surface normal does not coincide with the reference axis is defined as an off-axial curved surface. Also, an optical system including such off-axial curved surface is defined as an off-axial optical system.

It should be noted here that the surface normal does not coincide with the reference axis also when the reference axis is simply folded by a plane reflection surface. However, since in such case the plane reflection surface does not break the symmetry of aberration, such structure will be excluded from the category of off-axial optical system.

Although the reference axis which provides a reference for an optical system may be determined in the present embodiment as described above, for determination of the axis which provides a reference of an optical system, any convenient axis may be chosen from the standpoint of optical design, aberration adjustment or expression of the surface shapes that constitute the optical system.

However, generally the path of light which passes through the center of an image plane or observation plane, and a stop, entrance pupil, exit pupil or the center of the first surface of the optical system or, alternatively, the center of the last surface, is taken as the reference axis that provides a reference for the optical system.

The order of surfaces is set in accordance with the order in which the reference axis beam is reflected by them.

Thus, while the reference axis changes its advancement direction in accordance with the law of reflection and in the predetermined order of the surfaces, it finally reaches the center of the image plane.

With regard to the tilt surfaces constituting an optical system according to the preferred embodiments of the present invention to be described below, basically all of them may be tilted in the same plane. In consideration of this, the axes of an absolute coordinate system may be determined as follows.

Z axis: a reference axis which passes through the origin and extends toward the first surface.

Y axis: a straight line which passes through the origin and defines an angle of 90 degrees within the tilt plane, in a counterclockwise direction around the Z axis.

X axis: a straight line which passes through the origin and is perpendicular to the Z axis and Y axis, respectively.

On the other hand, when the surface shape of an i-th surface constituting an optical system is going to be depicted, the shape recognition will be made easier by, rather than by expressing the surface shape in terms of an absolute coordinate system, setting a local coordinate system having an origin taken at the point of intersection between the reference axis and the i-th surface and expressing the shape of that surface in terms of such local coordinate system.

In consideration of this, in the embodiments to be described below in which the structural data according to the present invention are going to be specified, the surface shape of the i-th surface will be expressed in terms of a local coordinate system.

Furthermore, the tilt angle of the i-th surface within the Y-Z plane is expressed in terms of an angle $\theta i$ (unit is degrees) which takes positive in the counterclockwise direction about the Z-axis of the absolute coordinate system.

Hence, in the preferred embodiments of the present invention to be described below, the origin of the local coordinate of each surface is put on the Y-Z plane.

Furthermore, there is no surface decentration within the X-Z plane and the X-Y plane.

Also, the y and z axes of the local coordinate (x, y, z) of the i-th surface are tilted by an angle $\theta i$ within the Y-Z in-plane, with respect to the absolute coordinate system (X, Y, Z). More specifically, these may be set as follows.

z-axis: a straight line which passes through the origin of the local coordinate system and defines an angle $\theta i$ in the counterclockwise direction within the Y-Z plane, with respect to the Z-axis direction of the absolute coordinate system.

y-axis: a straight line which passes through the origin of the local coordinate system and defines an angle 90 degrees in the counterclockwise direction within the Y-Z plane, with respect to the z-axis direction.

x-axis: a straight line which passes through the origin of the local coordinate system and which is perpendicular to the Y-Z plane.

Furthermore, the imaging optical element according to the preferred embodiments of the present invention to be described below may have aspherical surfaces of rotationally asymmetrical shape which can be expressed by the following equation.

$$z = C_{02}y^2 + C_{20}x^2 + C_{03}y^3 + C_{21}x^2y + C_{04}y^4 + C_{22}x^2y^2 + C_{40}x^4 + C_{05}y^5 + C_{23}x^2y^3 + C_{41}x^4y + C_{06}y^6 + C_{24}x^2y^4 + C_{42}x^4y^2 + C_{60}x^6 + \ldots$$

It should be noted here that a spherical surface has a shape which can be expressed by the following equation.

$$z = ((x^2+y^2)/r_i)/(1 + (1-(x^2+y^2)/r_i)^{1/2})$$

Since this curved-surface expression is comprised only of even-order terms with respect to x, the curved surface defined by the above curved-surface expression has a shape of plane symmetry, taking the y-z plane as a plane of symmetry.

It is difficult to directly calculate the focal length based on the paraxial theory. Hence, a conversion focal length $f_{eq}$ based on the following definition may be used.

$$f_{eq} = h_1/\tan(a_k')$$

It should be noted here that, when the number of reflection surfaces is odd, the sign of the focal length is expressed oppositely to an ordinary sign.

In the equation above, h1 is the incidence height of the light ray which is incident on the first surface while being in parallel to the reference axis and infinitely close to the reference axis, and $a_k'$ is the angle which the aforementioned light ray makes with respect to the reference axis when the same goes out of the final surface.

Furthermore, in the numerical examples to be explained below, Di is the scalar quantity which represents the spacing between the origins of local coordinate systems of the i-th surface and the (i+1)th surface, and Ndi is a refractive index of the medium between the i-th surface and the (i+1)th interface.

Embodiment 1

FIG. 1 is a schematic diagram of a main portion of a first embodiment, in the sub-scan section (Y-Z plane), when an imaging optical system (off-axial optical system) of the present invention is applied to an image reading apparatus for reading a color image or a monochromatic image.

Figure 2A:
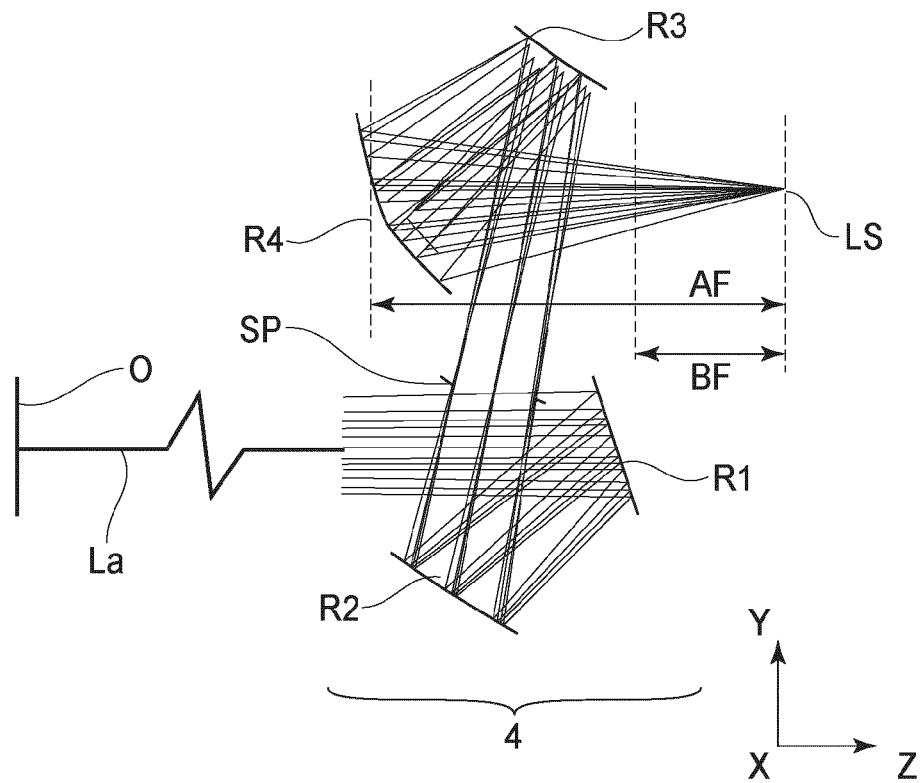
FIG. 2A is a sectional view along a main-scan section (Y-Z plane) of the first embodiment of the present invention.

FIG. 2A is a sectional view of a main portion, illustrating a general structure within the Y-Z plane (sub-scan section) when the light path in the first embodiment of the present invention is partly developed.

Figure 2B:
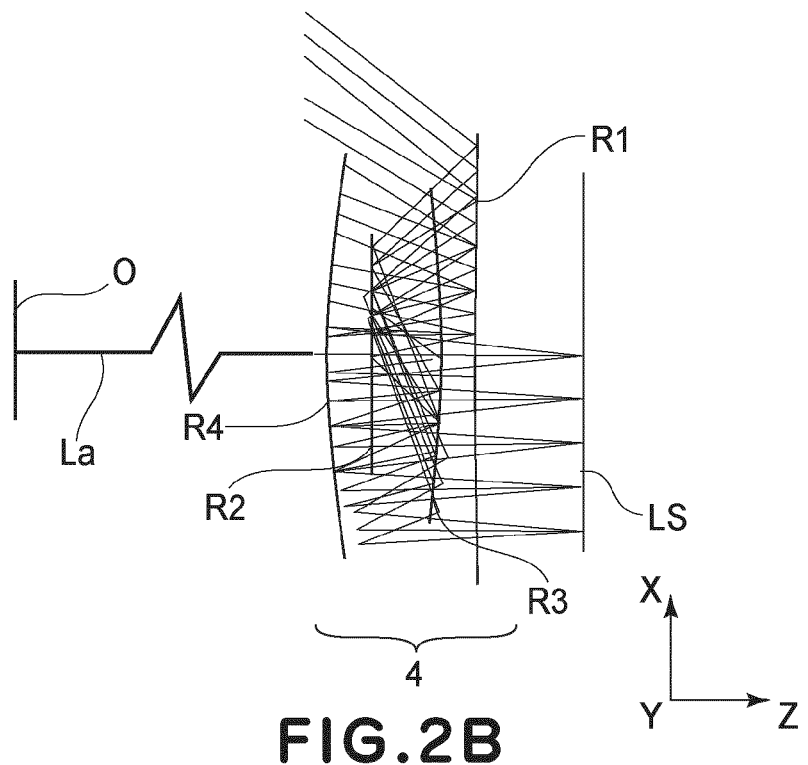
FIG. 2B is a sectional view along a sub-scan section (X-Z plane) of the first embodiment of the present invention.

FIG. 2B is a sectional view of a main portion, illustrating a general structure within the X-Z plane (main-scan section) when the light path in the first embodiment of the present invention is partly developed.

Denoted in these drawings at L is a light source (illumination means) which may comprise a fluorescent lamp or a xenon lamp, for example. Denoted at CG is an original table (original table glass) on which an original (monochromatic image or color image) O is placed.

Denoted at M1, M2 and M3 are first, second and third reflecting mirrors, respectively, which comprise a plane mirror. Denoted at 4 is an imaging optical system (off-axial optical system) for the image reading, and it is used to read imagewise information recorded on the surface of the original.

The imaging optical system 4 images a light beam based on the imagewise information of the original O, on the surface of an image pickup device (line sensor or CCD LS) to be described below.

The imaging optical system 4 of the present embodiment includes first, second, third and fourth off-axial optical elements 4a, 4b, 4c and 4d which comprise four reflection surfaces (off-axial reflection surfaces) R1, R2, R3 and R4 each being defined by a free-form curved surface being symmetric with respect to the reference axis in the main-scan direction and being asymmetric in the sub-scan direction.

Denoted at SP is a stop which is disposed between the second off-axial reflection surface R2 and the third off-axial reflection surface R3.

Denoted at La is a reference beam which comes from the center of the object and pass through the center of the stop SP.

Denoted at LS is a line sensor which is comprised a CCD (image pickup device), and it is disposed at a position corresponding to the image plane.

Here, the direction in which the picture elements (sensors) of the line sensor are arrayed (a direction which is perpendicular to the sheet of the drawing, i.e., X-direction) corresponds to the main-scan direction (main-scan section, i.e., X-Z plane). A direction which is orthogonal to it (a direction which is within the sheet of the drawing, i.e., Y-direction) corresponds to the sub-scan direction (sub-scan section, i.e., Y-Z plane).

Denoted at C is a movable carriage (housing) which accommodates therein these components L, M1, M2, M3, 4, and LS.

Denoted at AF is a distance to the image plane LS from one (R4) of the off-axial reflection surfaces which is optically closest to the image plane LS side where the image pickup device is placed. This distance AF is equivalent to the back focus in a rotationally symmetric coaxial system.

Denoted at BF is a minimum of the distance, along a light path (optical axis) from the off-axial reflection surface R4, optically closest to the image plane LS side, toward the image plane LS, which distance ranges from the sectional plane perpendicular to the optical axis and containing a portion of another off-axial reflection surface (surface R1 in the FIG. 2A example) to the image plane LS.

This distance BF substantially corresponds to the back focus in the off-axial optical system as described above.

In this embodiment, the powers of the surfaces R1-R4 are so set as to make this back focus BF long.

It should be noted here that, in this specification, the word "the optically" is used to refer "in the direction in which the light from the original advances".

In the present embodiment, the original (object) O placed on the original table CG is illuminated by the light beam emitted from the illumination means L. The light beam from the original O is imaged on the line sensor LS by means of the imaging optical system 4 and by way of the first, second and third reflecting mirrors M1, M2 and M3.

On the other hand, the relative position of the original O and the carriage C is changed in the sub-scan direction (in the direction of an arrow A), by which the original O is read two-dimensionally.

In the present embodiment, for compactification of the image reading apparatus, the light path is folded by using the first, second and third reflecting mirrors M1, M2 and M3.

The imaging optical system 4 does not produce chromatic aberration since it is comprised of surface-reflection surfaces. Thus, a wider view angle can be achieved easily.

As a result, the distance from the imaging optical system 4 to the original O can be shortened, such that an image reading apparatus having a carriage integral type optical system can be constituted by a less number of optical components including three pieces of plane mirrors and the imaging optical system 4.

The off-axial reflection surfaces R1, R2, R3 and R4 in the present embodiment have such structure that the light path is folded within the section along a line perpendicular to the line along the direction (X direction) in which the sensors of the line sensor LS are arrayed, namely, within the sub-scan section (Y-Z plane).

Furthermore, the off-axial reflection surfaces R1, R2, R3 and R4 are constituted by free-form curved reflection surfaces each being symmetric with respect to the main-scan direction and being asymmetric with respect to the sub-scan direction, as described above.

With this arrangement, asymmetric aberrations due to decentration and other aberrations are well adjusted in the present embodiment.

In the present embodiment, the combined power of two, first and second off-axial optical elements 4a and 4b in the main-scan direction, which are optically close to the original O side, is denoted by Mf. Also, the combined power of two, third and fourth off-axial optical elements 4c and 4d in the main-scan direction, which are optically close to the line sensor LS side (image pickup device side), is denoted by Mr, where 0<Mr.

Then, the structure is set to satisfy the following condition.

$$-0.3 < Mf/Mr < 0.3$$

$$0 < Mr \qquad\qquad (1)$$

By satisfying the above conditional expression (1) in the present embodiment, a compact image reading apparatus having a short optical path length is accomplished.

Furthermore, an imaging optical system having good optical performance and a substantially long back focus in ff-axial optical system is accomplished.

In the present embodiment, more preferably, one or more of conditional expressions (2)-(7) to be described below should be satisfied.

More specifically, in this embodiment, the combined power of two, first and second off-axial optical elements 4a and 4b in the sub-scan direction, which are optically close to the original O side, is denoted by Sf. Also, the combined power of two, third and fourth off-axial optical elements 4c and 4d in the sub-scan direction, which are optically close to the line sensor LS side (image pickup device side), is denoted by Sr. Then, the structure may be set to satisfy the following condition.

$$0.1 < Sf/Sr < 0.5 \qquad (2)$$

Furthermore, the power of the imaging optical system 4 in the main-scan direction is denoted by Mt, and the combined power of two off-axial optical elements 4a and 4b in the main-scan direction, which are optically close to the original O side, is denoted by Mf. Then, the structure may be set to satisfy the following condition.

$$-0.3 < Mf/Mt < 0.3 \qquad (3)$$

Furthermore, the power of the imaging optical system 4 in the sub-scan direction is denoted by St, and the combined power of two off-axial optical elements 4a and 4b in the sub-scan direction, which are optically close to the original O side, is denoted by Sf. On the other hand, the combined power of two off-axial optical elements 4c and 4d in the sub-scan direction, which are optically close to the line sensor LS side (image pickup device side), is denoted by Sr.

Then, the structure may be set to satisfy the following conditions.

$$0 < Sf/St < 0.6 \qquad (4)$$

$$-1.1 < Sr/St < 1.6 \qquad (5)$$

Furthermore, in the imaging optical system of the present embodiment, the length of the reference optical axes from the original surface O to the off-axial reflection surface R1 of the first off-axial optical element 4a is denoted by Lo (mm). Also, the length of the reference optical axes from the off-axial reflection surface R1 which is optically closest to the original surface O side to the line sensor LS surface (image pickup device surface) is denoted by Lb (mm).

Then, the structure may be set to satisfy the following conditions.

$$0.07 < Lb/Lo < 0.25 \qquad (6)$$

$$Lo < 400 \text{ mm} \qquad (7)$$

Next, the technical significance of conditional expressions (1)-(7) will be explained.

Conditional expression (1) concerns the power disposition in the main-scan direction, with regard to the power disposition of the whole system of the imaging optical system. Specifically, it relates to the ratio between the combined power of the surfaces at the original surface side and the combined power of the surfaces at the image plane (line sensor LS) side, across the stop SP.

In the following, for convenience of explanation, the reflection surfaces at the original surface O side of the stop SP will be referred to as a fore group, while the reflection surfaces at the image plane side of the stop SP will be referred to as a rear group.

If the lower limit of conditional expression (1) is exceeded, the combined power Mf of the fore group in the main-scan direction enlarges in the negative direction relative to the combined power Mr of the rear group in the main-scan direction. Thus, the optical path length of the optical system is prolonged.

As a result, it is difficult to achieve a compact optical system that can be used in a carriage integral type.

Furthermore, since the absolute magnitude of the combined power of the rear group becomes large, correction of aberrations produced there is difficult to accomplish.

On the contrary, if the upper limit of conditional expression (1) is exceeded, the combined power Mf of the fore group in the main-scan direction enlarges in the positive direction relative to the combined power Mr of the rear group in the main-scan direction. Hence, the back focus of the optical system, namely, the substantial back focus of the off-axial optical system, is shortened.

As a result, light rays are liable to be eclipsed by the CCD or the CCD hold member. Also, the installation becomes difficult to do.

By satisfying conditional expression (1), an imaging optical system having a short optical path length and being compact, yet having a long back focus and being able to be installed easily, can be accomplished.

Furthermore, by satisfying this conditional expression (1), various aberrations are easily reduced, such that an imaging optical system in which the optical path length and the back focus are well balanced is achieved.

Conditional expression (2) concerns the power disposition in the sub-scan direction with decentration, with regard to the power disposition of the whole system of the imaging optical system. Specifically, it relates to the ratio between the combined power of the surfaces at the original surface side and the combined power of the surfaces at the image plane side, across the stop SP.

If the combined power Sr of the rear group in the sub-scan direction exceeds the lower limit of conditional expression (2) and becomes large relative to the combined power of the whole system in the sub-scan direction, adjustment of various aberrations to be produce by the rear group becomes difficult to do.

Furthermore, since the combined power of the fore group becomes relatively small, divergence of light beam to the rear group is widened which requires a larger effective surface of the rear group.

As a result of this, the optical system becomes large.

If the combined power Sr of the rear group in the sub-scan direction exceeds the upper limit of conditional expression (2) and becomes close to the combined power Sf of the fore group in the sub-scan direction, the balance of combined powers of the fore group and the rear group will be lost, and the back focus will be shortened.

As a result, installation of the CCD or the CCD holding member becomes difficult to do.

By satisfying conditional expression (2), it is assured to provide an imaging optical system having a long back focus and being easy to install, yet keeping compactness in size of the optical system.

Furthermore, by satisfying this conditional expression (2), the effective diameter of the rear group can be kept small and aberrations can be adjusted in a good balance.

Conditional expression (3) concerns the power disposition in the main-scan direction, with regard to the power disposition of the whole system of the imaging optical system. Specifically, it represents the ratio of the power of the fore group to the power of the whole optical system in the main-scan direction.

If the lower limit of conditional expression (3) is exceeded, the combined power Mf of the fore group in the main-scan direction enlarges in the negative direction, relative to the combined power Mt of the whole optical system in the main-scan direction. Thus, the optical path length of the optical system is prolonged.

As a result, it is difficult to achieve a compact optical system that can be used in a carriage integral type.

Furthermore, since the absolute magnitude of the combined power of the rear group becomes large, correction of aberrations produced there is difficult to accomplish.

To the contrary, if the upper limit of conditional expression (3) is exceeded, the combined power Mf of the fore group in the main-scan direction will occupy a large proportion relative to the power Mt of the whole system in the main-scan direction. Hence, the back focus of the optical system, namely, the substantial back focus of the off-axial optical system, is shortened.

As a result, light rays are liable to be eclipsed by the CCD or the CCD hold member. Also, the installation becomes difficult to do.

By satisfying conditional expression (3), it is assured to provide a compact imaging optical system having a short optical path length, yet having a long back focus and being easy to install.

Furthermore, by satisfying this conditional expression (3), various aberrations can be easily corrected, and an imaging optical system having well balanced optical path length and back focus is accomplished.

Conditional expressions (4) and (5) concern the power disposition in the sub-scan direction with decentration, with regard to the power disposition of the whole system of the imaging optical system. Specifically, it relates to the ratio of the combined power of the surfaces at the original surface side and the combined power of the surfaces at the image plane side, across the stop SP, relative to the power St of the whole optical system in the sub-scan direction.

If the combined power Sf of the fore group in the sub-scan direction exceeds the lower limit of conditional expression (4) and becomes small relative to the combined power of the whole system in the sub-scan direction, adjustment of various aberrations to be produced by the rear group becomes difficult to do.

Furthermore, divergence of light beam to the rear group is widened which requires a larger effective surface of the rear group.

As a result, the optical system becomes large.

If on the other hand the combined power Sf of the fore group in the sub-scan direction exceeds the upper limit of conditional expression (4) and becomes large relative to the combined power of the whole system in the sub-scan direction, the back focus will be shortened.

As a result, installation of the CCD or the CCD holding member becomes difficult to do.

If the combined power Sr of the rear group in the sub-scan direction exceeds the lower limit of conditional expression (5) and becomes small relative to the combined power of the whole system in the sub-scan direction, the back focus will be shortened.

As a result, installation of the CCD or the CCD holding member becomes difficult to do.

If the combined power Sr of the rear group in the sub-scan direction exceeds the upper limit of conditional expression (5) and becomes large relative to the combined power of the whole system in the sub-scan direction, adjustment of various aberrations to be produced by the rear group becomes difficult to do.

By satisfying conditional expressions (4) and (5), it is assured to provide an imaging optical system having a long back focus and being easy to install, yet keeping compactness in size of the optical system.

Furthermore, by satisfying these conditional expressions (4) and (5), the effective diameter of the rear group can be kept small and aberrations can be adjusted in a good balance.

Conditional expression (6) concerns the ratio between the back focus and the optical path length of the imaging optical system.

If the ratio of back focus becomes small exceeding the lower limit of conditional expression (6), the back focus will be shortened, and the precision for adjustment of the CCD or the holding member thereof will be degraded.

If, to the contrary, the structure is going to be arranged within a practical range of adjustment precision, the optical path length will be too long. Hence, it is difficult to accomplish the compactness and the length of the back focus at the same time.

If the ratio of back focus becomes large, exceeding the upper limit of conditional expression (6), the diameter of light incident on each surface of the rear group becomes large, which requires a larger effective diameter of the rear group. Furthermore, it causes more eclipse of light.

Conditional expression (7) concerns the optical path length of the imaging optical system.

If conditional expression (7) is unsatisfied, it becomes difficult to mount the imaging optical system into a compact image reading apparatus.

Thus, by satisfying conditional expression (7), it is assured to provide an optical system having a controlled compact size of optical system and yet being easy to adjust.

More preferably, conditional expressions (1)-(7) mentioned above had better be set as follows.

$$-0.2 < Mf/Mr < 0.1 \text{ and } 0 < Mr \quad (1a)$$

$$0.15 < Sf/Sr < 0.4 \quad (2a)$$

$$-0.2 < Mf/Mt < 0.2 \quad (3a)$$

$$0.2 < Sf/St < 0.58 \quad (4a)$$

$$1.15 < Sr/St < 1.5 \quad (5a)$$

$$0.08 < Lb/Lo < 0.18 \quad (6a)$$

$$100 \text{ mm} < Lo < 280 \text{ mm} \quad (7a)$$

The image reading apparatus of the present embodiment is configured to directly image the imagewise information of the original, upon the line sensor LS, without producing an intermediate image.

Without making such intermediate image of the imagewise information of the original as described above, an imaging optical system having a short optical path length can be achieved.

It should be noted here that, although in this embodiment, the stop SP is provided between the second off-axial reflection surface R2 and the third off-axial reflection surface R3, this may be changed. For example, the stop SP may be provided on the second off-axial reflection surface R2 or the third off-axial reflection surface R3.

Namely, the position of the stop SP is not limited to the one shown in this embodiment.

In accordance with the present embodiment as described hereinbefore, the optical path length can be made short and compact while assuring good optical performance, and thus the substantial back focus of the off-axial optical system can be made long.

Figure 3:
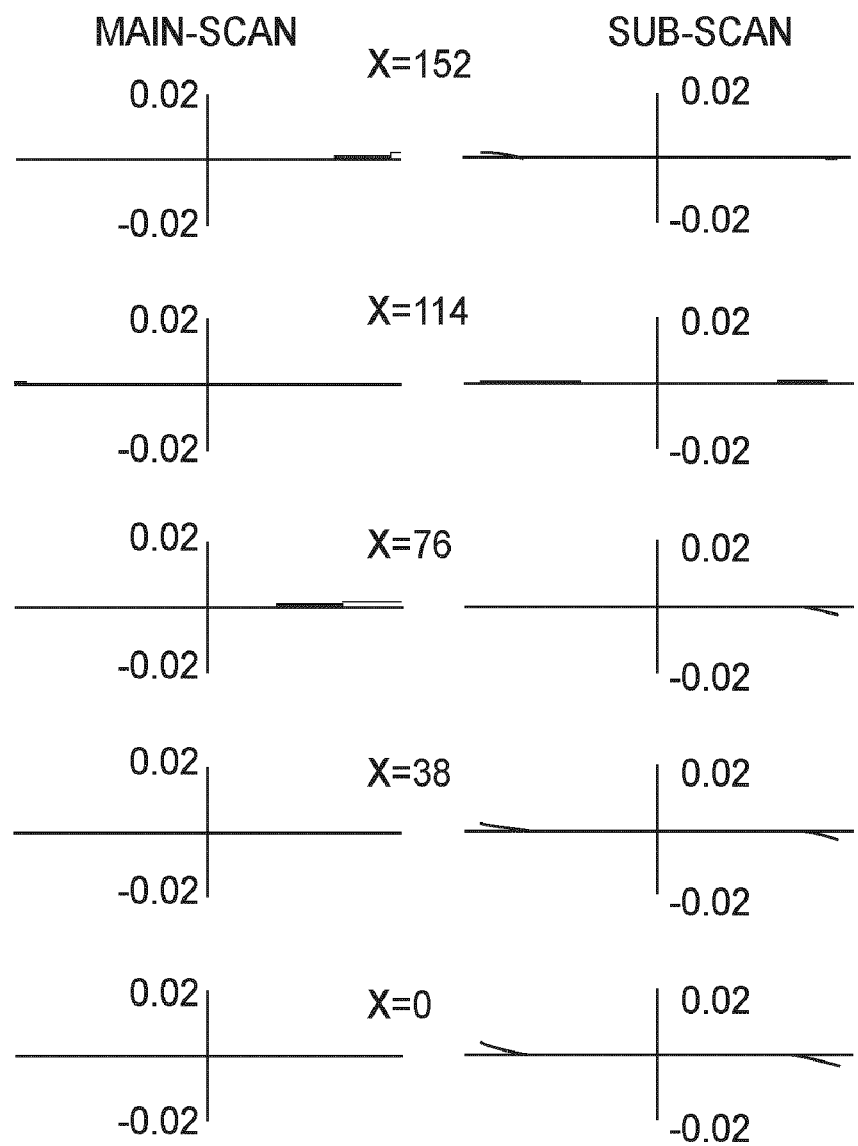
FIG. 3 is diagram showing transverse aberration of the optical system according to the first embodiment of the present invention.

FIG. 3 is a diagram which depicts transverse aberrations at five points (image heights) on the line sensor in the main-scan direction (line direction), according to Numerical Example 1 to be described below.

Here, the main-scan direction refers to the direction in which the picture elements (sensors) of the line sensor LS are arrayed (namely, a direction perpendicular to the sheet of the drawing, and it is X-direction). A direction perpendicular to it (namely, a direction within the sheet of the drawing, and it corresponds to Y-direction) is the sub-scan direction (sub-scan section, and Y-Z plane).

Denoted in the drawing at X is the height (image height) on the original surface. It is seen from FIG. 3 that in the present embodiment the optical performance is secured despite the field angle is wide.

Numeric data of Numerical Example 1 for the imaging optical system 4 corresponding to the first embodiment of the present invention will be shown below.

Table 1 below shows numerical values in the aforementioned conditional expressions and Numerical Example 1.

Numerical Example 1

Original Reading Width=305.0
Imaging Magnification=−0.11
Original Side NA=0.01194
$f_{eq}$=24.874
[Table 1]

TABLE 1

| i | Yi | Zi | θi | Di | Ndi | |
|---|---|---|---|---|---|---|
| 1 |  |  | 0 | 182.5555 | 1 | Object Plane (Original Surface) |
| 2 | 0.0000 | 0.0000 | 18.50 | −13.0942 | 1 | Reflection Surface |
| 3 | −7.8803 | −10.4575 | 58.00 | 12.5047 | 1 | Reflection Surface |
| 4 | 4.3947 | −8.0714 | 79.00 | 20.4807 | 1 | Stop |
| 5 | 24.4992 | −4.1635 | 56.29 | −13.8182 | 1 | Reflection Surface |
| 6 | 16.8545 | −15.6746 | 16.49 | 26.3714 | 1 | Reflection Surface |
| 7 | 16.5699 | 10.6953 | −0.62 |  | 1 | Image Plane |

[Aspherical Surface Configuration]

Surface R1

| | | |
|---|---|---|
| C02: 6.7196E−03 | C03: −1.2395E−03 | C04: 8.9009E−05 |
| C05: −9.2429E−06 | C06: 3.8641E−07 | C07: −1.8528E−09 |
| C08: −8.7375E−10 | C20: 2.0982E−03 | C21: −3.1257E−04 |
| C22: 3.0465E−05 | C23: −3.0449E−06 | C24: 3.2797E−07 |
| C25: −1.5200E−08 | C26: 5.1181E−10 | C40: −2.6898E−06 |
| C41: 2.1918E−07 | C42: −1.4755E−08 | C43: −2.0711E−10 |
| C44: −5.1063E−11 | C60: 2.6155E−09 | C61: −2.0117E−10 |
| C62: 2.2657E−11 | C80: −1.3874E−12 | |

Surface R2

| | | |
|---|---|---|
| C02: 8.4731E−03 | C03: −5.6683E−04 | C04: −6.3708E−06 |
| C05: −1.7566E−06 | C06: −1.7922E−07 | C07: −1.4695E−08 |
| C08: −1.3144E−09 | C20: 4.4102E−04 | C21: −2.8125E−04 |
| C22: −2.1611E−06 | C23: −9.0943E−09 | C24: −4.5364E−08 |
| C25: 1.0162E−08 | C26: 1.7764E−09 | C40: −5.3566E−06 |
| C41: 4.5551E−07 | C42: 2.2650E−08 | C43: 9.9504E−10 |
| C44: 4.6929E−10 | C60: 1.7053E−08 | C61: −1.3281E−09 |
| C62: −1.1110E−10 | C80: −3.7833E−11 | |

Surface R3

| | | |
|---|---|---|
| C02: 1.4607E−02 | C03: −6.1357E−04 | C04: 2.4672E−05 |
| C05: −1.5950E−05 | C06: 1.0219E−06 | C07: 5.5787E−08 |
| C08: 1.8154E−09 | C20: −5.2004E−03 | C21: −2.1681E−04 |
| C22: −2.0582E−05 | C23: −2.1086E−07 | C24: 1.2985E−08 |
| C25: 6.8142E−08 | C26: 9.5092E−10 | C40: −3.4882E−06 |
| C41: −6.9193E−08 | C42: 3.2465E−08 | C43: 8.0331E−11 |
| C44: 3.2708E−10 | C60: 2.5356E−09 | C61: −1.0017E−10 |
| C62: −3.6840E−11 | C80: −2.3623E−12 | |

Surface R4

| | | |
|---|---|---|
| C02: 1.5314E−02 | C03: 1.4510E−05 | C04: 1.8554E−06 |
| C05: −9.1423E−07 | C06: −6.9311E−09 | C07: −1.5748E−09 |
| C08: −1.3980E−10 | C20: 6.2222E−03 | C21: −1.4979E−04 |
| C22: −3.9715E−06 | C23: −3.7750E−07 | C24: −2.9509E−08 |
| C25: −4.3258E−11 | C26: −2.2146E−11 | C40: −3.5410E−06 |
| C41: −2.8733E−07 | C42: −9.3906E−09 | C43: −2.9515E−10 |
| C44: 1.1740E−11 | C60: −3.5265E−09 | C61: −1.4750E−10 |
| C62: 1.2617E−12 | C80: −1.4592E−14 | |

Embodiment 2

Figure 4:
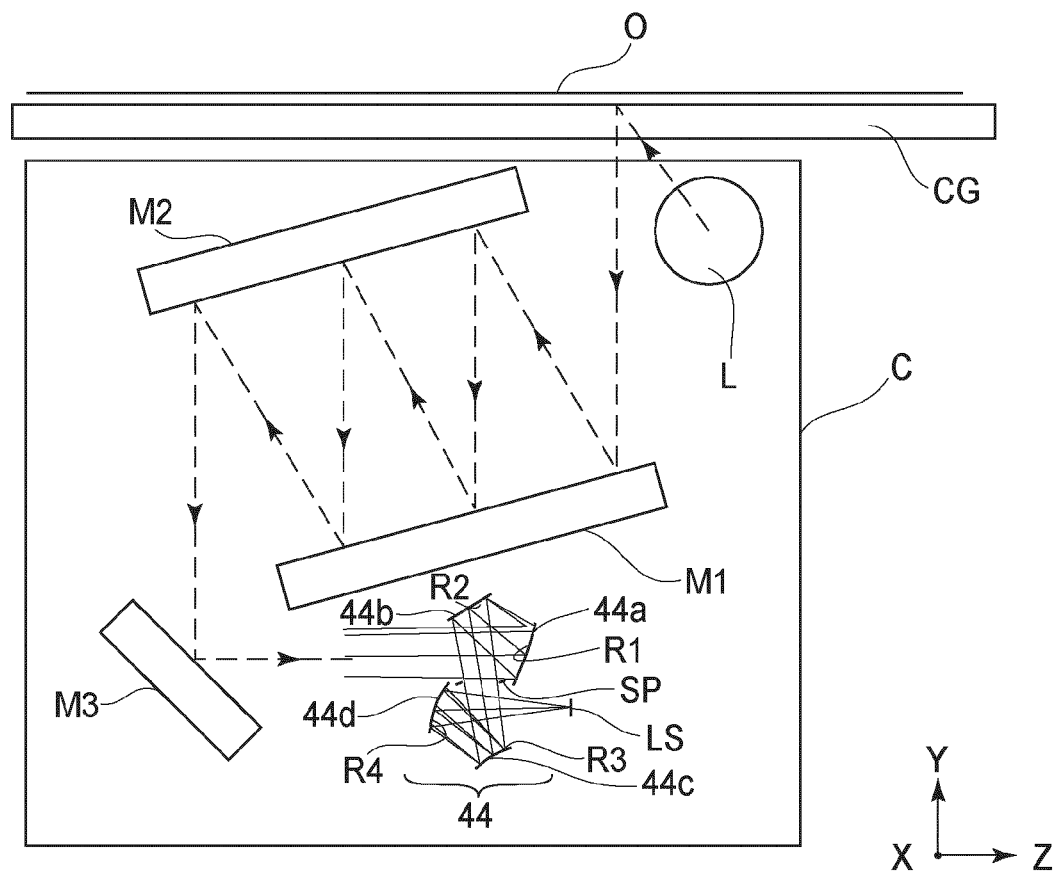
FIG. 4 is a schematic diagram of a main portion of an image reading apparatus according to a second embodiment of the present invention.

FIG. 4 is a schematic diagram of a main portion, in the sub-scan section (Y-Z plane) of a second embodiment, where an imaging optical system of the present invention is applied to an image reading apparatus for reading a color image or a monochromatic image.

Figure 5A:
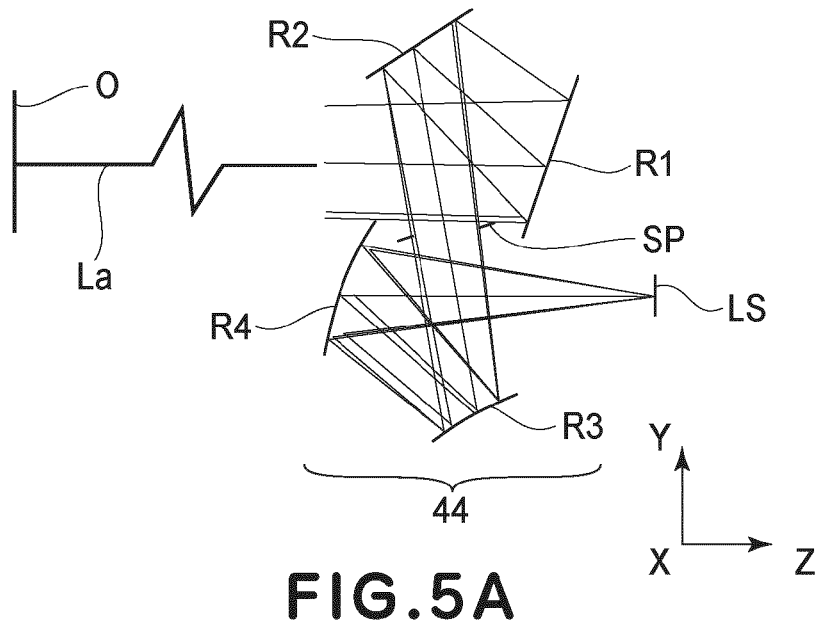
FIG. 5A is a sectional view along a main-scan section (Y-Z plane) of the second embodiment of the present invention.

FIG. 5A is a sectional view of a main portion, illustrating a general structure within the Y-Z plane (sub-scan section) when the light path in the second embodiment of the present invention is partly developed.

Figure 5B:
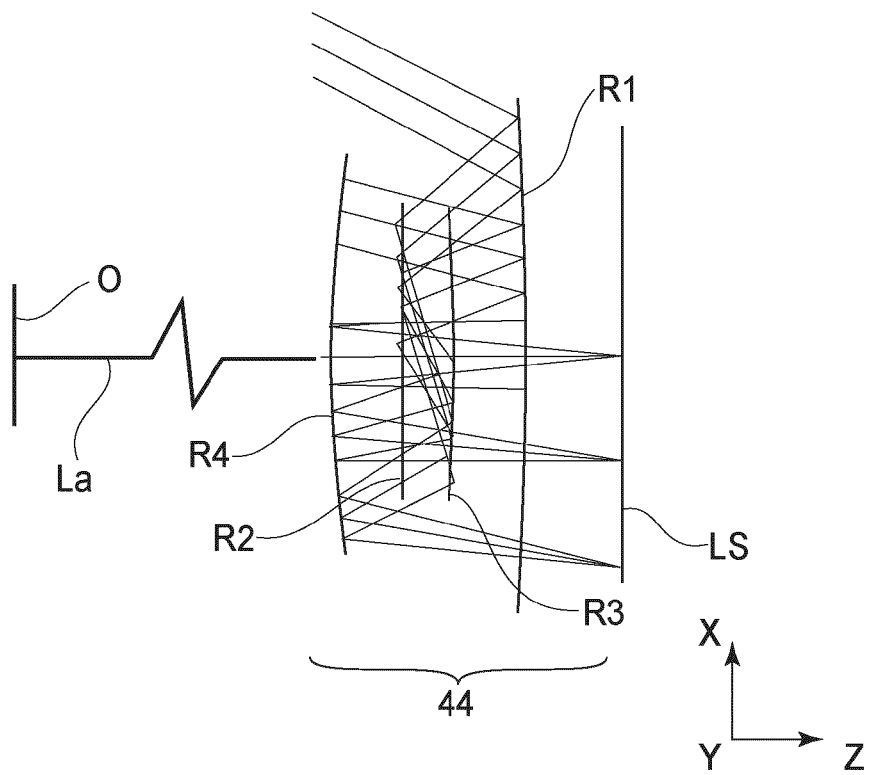
FIG. 5B is a sectional view along a sub-scan section (X-Z plane) of the second embodiment of the present invention.

FIG. 5B is a sectional view of a main portion, illustrating a general structure within the X-Z plane (main-scan section) when the light path in the second embodiment of the present invention is partly developed.

In FIG. 4, FIG. 5A and FIG. 5B, like numerals are assigned to components corresponding to those shown in FIG. 1, FIG. 2A and FIG. 2B, respectively.

The present embodiment differs from the first embodiment in that an imaging optical system 44 of the present invention is applied to an image reading apparatus having a narrower image reading width as compared with the first embodiment. Other structures and optical functions are similar to those of the first embodiment, and thus similar advantageous results are obtainable.

More specifically, denoted In these drawings at 44 is an imaging optical system (off-axial optical system) which images a light beam based on the imagewise information of original O, upon a line sensor (CCD) LS as an image pickup device (reading means) to be described below.

The imaging optical system 44 of the present embodiment includes first, second, third and fourth off-axial optical elements 44a, 44b, 44c and 44d which comprise four reflection surfaces (off-axial reflection surface) R1, R2, R3 and R4, respectively, each being defined by a free-form curved surface being symmetric in the main-scan direction, with respect to the reference axis, and being asymmetric in the sub-scan direction.

In the present embodiment, the reading width (220.0 mm) of the original is narrower as compared with the first embodiment. Hence, the imaging optical system 44 is set with the power disposition attaining good balance between compactification and aberration adjustment.

With this arrangement, the present embodiment assures, like the first embodiment described hereinbefore, an optical imaging system 44 in which the optical path length is short and compact while assuring good optical performance, and the substantial back focus of the off-axial optical system is long.

The present embodiment functions quite effective even in relation to various specifications as shown in Numerical Example 2 to be described below.

Figure 6:
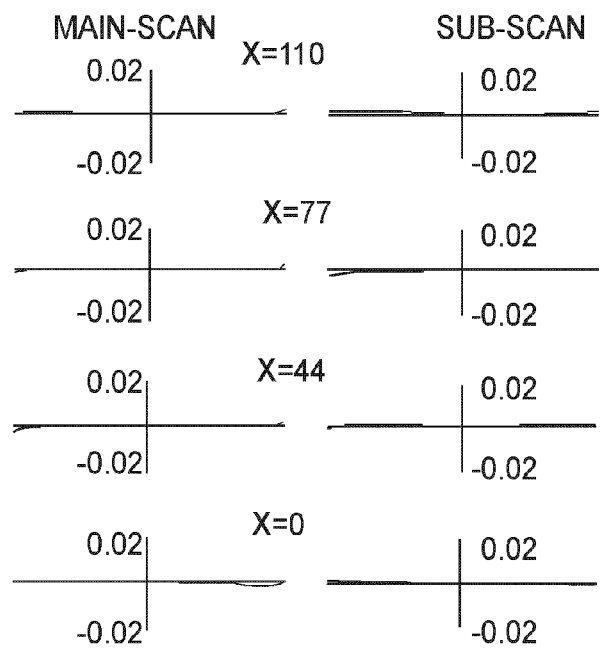
FIG. 6 is diagram showing transverse aberration of the optical system according to the second embodiment of the present invention.
Figure 7:
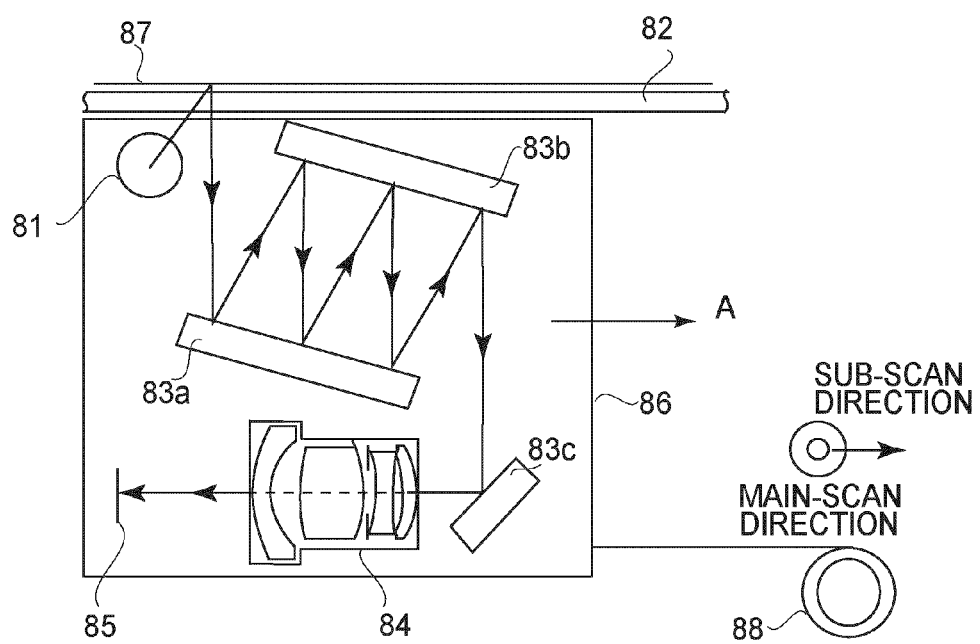
FIG. 7 is a schematic diagram which shows a disposition example of a conventional carriage integral type scanning optical system.
Figure 8:
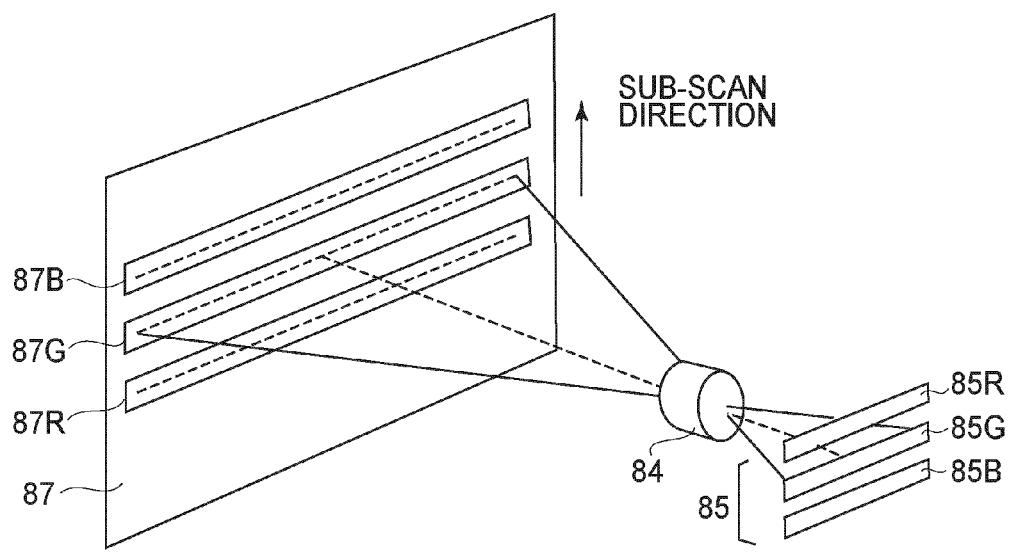
FIG. 8 is a schematic diagram of a main portion of a conventional color image reading apparatus.

FIG. 6 is a diagram which depicts transverse aberrations at five points (image heights) on the line sensor in the main-scan direction (line direction), according to Numerical Example 2 to be described below.

Denoted in the drawing at X is the height (image height) on the original surface. It is seen from FIG. 6 that in the present embodiment the optical performance is secured despite the field angle is wide.

Numeric data of Numerical Example 2 for the imaging optical system 44 corresponding to the second embodiment of the present invention will be shown below.

Table 2 below shows numerical values in the aforementioned conditional expressions and Numerical Example 2.

Numerical Example 2

Original Reading Width=220.0
Imaging Magnification=−0.11
Original Side NA=0.01
$f_{eq}$=32.425

[Table 2]

TABLE 2

| i | Yi | Zi | θi | Di | Ndi | |
|---|---|---|---|---|---|---|
| 1 | | | 0 | 190.0000 | 1 | Object Plane (Original Surface) |
| 2 | 0.0000 | 0.0000 | −20.00 | 10.0000 | 1 | Reflection Surface |
| 3 | 6.4279 | −7.6604 | −60.00 | 10.0000 | 1 | Reflection Surface |
| 4 | −3.4202 | −5.9240 | −80.00 | 10.0000 | 1 | Stop |
| 5 | −13.2683 | −4.1875 | −60.00 | 10.0000 | 1 | Reflection Surface |
| 6 | −6.8404 | −11.8479 | −20.00 | 17.8780 | 1 | Reflection Surface |
| 7 | −6.8404 | 6.0301 | 0.00 | | 1 | Image Plane |

[Aspherical Surface Configuration]

Surface R1

| | | |
|---|---|---|
| C02: −7.6340E−03 | C03: −2.5893E−04 | C04: 2.5178E−05 |
| C05: −6.5531E−08 | C06: −1.6582E−07 | C20: −1.4889E−03 |
| C21: −5.4543E−05 | C22: −9.0050E−06 | C23: −3.3223E−07 |
| C24: −6.3632E−08 | C40: −2.2160E−06 | C41: −2.0402E−07 |
| C42: −1.0437E−10 | C60: 1.7300E−09 | |

Surface R2

| | | |
|---|---|---|
| C02: −5.4943E−03 | C03: −1.0442E−04 | C04: 9.4161E−05 |
| C05: 1.4597E−06 | C06: −2.2154E−06 | C20: −6.4330E−04 |
| C21: −1.5404E−04 | C22: −3.1054E−05 | C23: −3.1262E−07 |
| C24: −1.0130E−07 | C40: −7.8862E−06 | C41: −1.3581E−06 |
| C42: 1.2613E−07 | C60: 8.3488E−09 | |

Surface R3

[Aspherical Surface Configuration]

| | | |
|---|---|---|
| C02: 1.8437E−02 | C03: 3.8128E−03 | C04: 4.2170E−04 |
| C05: 4.4612E−05 | C06: 1.2330E−06 | C20: −6.1029E−03 |
| C21: −3.4698E−04 | C22: −6.3660E−05 | C23: −2.5027E−06 |
| C24: 7.0618E−08 | C40: −5.9732E−06 | C41: 8.8869E−07 |
| C42: 3.6883E−07 | C60: 7.8248E−09 | |

Surface R4

| | | |
|---|---|---|
| C02: 2.1764E−02 | C03: 6.8873E−04 | C04: −4.0272E−05 |
| C05: 3.4816E−06 | C06: −2.1671E−08 | C20: 7.7281E−03 |
| C21: −1.4760E−04 | C22: 2.3856E−06 | C23: 1.7988E−06 |
| C24: −1.2143E−07 | C40: −6.1248E−06 | C41: 3.0649E−07 |
| C42: −1.9795E−08 | C60: −5.4348E−09 | |

[Table 3]

TABLE 3

| | Conditional Expression | Embodiment 1 | Embodiment 2 |
|---|---|---|---|
| (1) | Mf/Mr | −0.17 | 0.07 |
| (2) | Sf/Sr | 0.38 | 0.19 |
| (3) | Mf/Mt | −0.16 | 0.07 |
| (4) | Sf/St | 0.56 | 0.22 |
| (5) | Sr/St | 1.49 | 1.17 |
| (6) | Lb/Lo | 0.15 | 0.09 |
| (7) | Lo | 178.6 | 200 |

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-349556 filed Dec. 26, 2006, for which is hereby incorporated by reference.

What is claimed is:

1. An imaging optical system for imaging imagewise information provided on a surface of an original, upon a surface of an image pickup device such that read the imagewise information is read based on signals from the image pickup device, said imaging optical system comprising:

four off-axial reflection surfaces which are asymmetric within a sub-scan section, wherein, when a combined power, in a main-scan direction, of two off-axial reflection surfaces of said four off-axial reflection surfaces which are optically close to an original side is denoted by Mf and a combined power, in the main-scan direction, of two off-axial reflection surfaces of said four off-axial reflection surfaces which are optically close to an image pickup device side is denoted by Mr, relations $-0.3 < Mf/Mr < 0.3$ $0 < Mr$ are satisfied.

2. An imaging optical system according to claim 1, wherein, when a combined power, in a sub-scan direction, of two off-axial reflection surfaces of said four off-axial reflection surfaces which are optically close to the original side is denoted by Sf and a combined power, in the sub-scan direction, of two off-axial reflection surfaces of said four off-axial reflection surfaces which are optically close to the image pickup device side is denoted by Sr, a relation $0.1 < Sf/Sr < 0.5$ is satisfied.

3. An imaging optical system according to claim 1, wherein, when a power of said imaging optical system in the main-scan direction is denoted by Mt and the combined power, in the main-scan direction, of two off-axial reflection surfaces of said four off-axial reflection surfaces which are optically close to the original side is denoted by Mf, a relation $$-0.3 < Mf/Mt < 0.3$$

is satisfied.

4. An imaging optical system according to claim 1, wherein, when a power of said imaging optical system in the sub-scan direction is denoted by St, the combined power, in the sub-scan direction, of two off-axial reflection surfaces of said four off-axial reflection surfaces which are optically close to the original side is denoted by Sf, and a combined power, in the sub-scan direction, of two off-axial reflection surfaces of said four off-axial reflection surfaces which are optically close to the image pickup device side is denoted by Sr, relations $$0 < Sf/St < 0.6$$

$$1.1 < Sr/St < 1.6$$

are satisfied.

5. An imaging optical system according to claim 1, wherein, when a length of a reference axis from the surface of the original to one off-axial reflection surface which is optically closest to the surface of the original is denoted by Lo (mm), and a length of the reference axis from the one off-axial reflection surface optically closest to the surface of the original, to the surface of the image pickup device, is denoted by Lb (mm), relations $$0.07 < Lb/Lo < 0.25$$

$$Lo < 400 \text{ mm}$$

are satisfied.

6. An image reading apparatus, comprising:
an imaging optical system as recited in claim 1;
an original table on which an original is to be placed; and
an image pickup device,
wherein imagewise information of the original placed on said original table is imaged upon said image pickup device by means of said imaging optical system, and
wherein the original and said image pickup device are relatively moved relative to each other, by which the imagewise information of the original is read based on signals from said image pickup device.

* * * * *